United States Patent
Hayes et al.

(10) Patent No.: US 6,523,424 B1
(45) Date of Patent: *Feb. 25, 2003

(54) POWER LINE SAG MONITOR

(76) Inventors: Ray M. Hayes, 3303 Eckert Rd., Lancaster, OH (US) 43130; Ali Nourai, 6332 Tanera More Ct., Dublin, OH (US) 43017

(*) Notice: Subject to any disclaimer, the term of this patent is extended or adjusted under 35 U.S.C. 154(b) by 117 days.

This patent is subject to a terminal disclaimer.

(21) Appl. No.: 09/692,624

(22) Filed: Oct. 20, 2000

Related U.S. Application Data

(63) Continuation of application No. 09/167,606, filed on Oct. 7, 1998, now Pat. No. 6,205,867.

(51) Int. Cl.[7] .................................................. G01L 5/04
(52) U.S. Cl. .................................................. 73/862.391
(58) Field of Search ..................... 73/862.391, 493; 324/127; 340/870.16

(56) References Cited

U.S. PATENT DOCUMENTS 4,728,887 A * 3/1988 Davis ........................ 324/127

* cited by examiner

Primary Examiner—John E. Chapman
(74) Attorney, Agent, or Firm—Sand & Sebolt

(57) ABSTRACT

An accelerometer properly positioned in conjunction with an energized electrical conductor produces an output that is dependent on conductor's inclination angle in real time where the inclination angle is then used to calculate the sag of the conductor. A transmitter is used to communicate this information in real time to a central location such that up to optimal or maximum power transmission is feasible through the conductor while maintaining safe clearance from the ground. This allows for close monitoring of thermal expansion resulting from increased load as well as varying environmental conditions.

30 Claims, 5 Drawing Sheets

POWER LINE SAG MONITOR

"This application is a continuation of application Ser. No. 09/167,606, filed Oct. 7, 1998, now U.S. Pat. No. 6,205,867, issued Mar. 27, 2001."

BACKGROUND OF THE INVENTION

1. Technical Field

The invention relates to an apparatus and method of monitoring the sag in energized electrical conductors such as power lines so as to assure safe clearance from the ground. More particularly, the invention relates to an apparatus and method for measuring the sag of energized electrical conductors such as power lines in real time as it changes with varying electrical load on the line as well as varying environmental conditions causing thermal expansion where the sag monitor assists in the determination of the maximum power transmission feasible through such conductor while maintaining safe clearance from the ground. Specifically, the invention is an accelerometer or inclinometer that is used in conjunction with an energized electrical conductor to sense inclination angle (relative to horizontal) of the suspended conductor at a given suspension point in real time and at regular intervals based upon a voltage output of the accelerometer that is dependent on its angle where the inclination angle is then used to calculate the sag of the conductor which is then used to determine the maximum allowable power transmission while still maintaining safe clearance between the energized electrical conductor and the ground or other obstruction.

2. Background Information

With deregulation of utilities including electrical utilities, it is now more important than ever that utilities be efficient in the delivery of services since competition now exists. In addition, deregulation has opened up new markets for individual utilities and as a result all utilities are seeking to expand while defending their home region. As a result, there is an ever increasing need for electric utilities to transfer more power through their existing power lines, that is to maximize transmission through existing resources.

It is well known in the power transmission industry that one of the major hurdles to increased power transmission is clearance between the power line and the ground or structure. Code mandated safety considerations for overhead or suspended power lines requires utilities to provide adequate clearances between the ground and/or structures under the power line. This clearance must be maintained at all times including in all weather conditions and under all actual load conditions.

This is one of the major considerations to electrical utilities because power lines sag under increasing power loads and as a result limitations are placed on the ampacity or maximum load a line is allowed to carry. Basically, the reason for this is the well known principal that power lines sag as load is placed on the power line and that sag increases as the load increases. This sag-load correlation is the result of heat causing thermal expansion of the conductor corresponding to load levels. In more detail, heat is generated in the conductor by the resistance losses resulting as electrical current flows through it. This heat causes thermal expansion of the conductor. As load increases more heat is generated resulting in ever increasing thermal expansion of the power line causing the power line to sag closer to the ground. Since government regulations mandate the minimum clearance, utilities must assure that this minimum clearance is never violated.

In addition, numerous other factors also affect the suspended power line and the sag therein including ambient temperature (warmer temperatures increase sag), and wind speed and direction (wind usually cools the line and thus decreases sag). All of these factors, and primarily the thermal expansion, are critical considerations to electrical utilities as indicated above because steps must be taken to assure the adequate clearances as required by law are maintained. As a result, ampacity or maximum load is generally limited to less than maximum levels as a safety factor to assure minimum clearance is maintained at all times and under all weather and load conditions. It is often typical that the safety is a significant factor and thus maximum load is significantly affected.

It is well known in the industry that such adequate clearance regulations are necessary because power lines, after being installed in relation to the ground or structures, later sag so as to become too close to the ground or structures resulting in significant safety concerns. One such concern is that when power lines sag too close to the ground, electrical shock or contact with the lines becomes more feasible and thus safety is at issue. Another such concern is that electric flashover scenarios are possible as lines become too close to electrically grounding objects such as the ground or structures, and such electric flashover is likely to result in extensive damage.

During installation and before a load is placed on the lines, the power lines can be installed such that sufficient clearance is achieved. This can readily be done by mere visual sight alignment or by simple measurement techniques measuring the distance from the lowest part of the line to the ground or nearest structure. It is even possible to very roughly account for factors such as ambient temperature, wind speed, wind direction and other environmental factors using conservative assumptions and historical knowledge. It is noteworthy though that such conservative assumptions result in significantly less than maximum line loading.

However, once an electrical load is placed on the power lines, various load factors cause the power lines to sag. Of these various factors, by far the most significant is thermal expansion of the power line under load as mentioned above, and specifically under a continuously varying load. It is well known that the clearance between a suspended electrical conductor and the ground decreases as the conductor sags due to this thermal expansion under load. Thermal expansion is directly correlated to load in the conductor such that increased load results in increased thermal expansion. Due to the desire to transmit as much power as possible through electrical conductors, this thermal expansion and the resulting sag is critical.

It has been realized that the full utilization of transmission lines requires proper analysis of sag and clearance with respect to these sag factors and most importantly the thermal expansion factor. In theory, this allows for the calculation of maximum load which still provides for minimum clearance as required by safety regulations. Current technology is such that several approximate methods provide for such approximation or calculation.

The first prior art method involves measuring the temperature of the conductor at a spot. Mathematical modeling is then used to calculate the sag. It has been found that this method is an approximation at best because line temperature varies based upon location radially within the line, location on the line, wind, exposure to elements, etc. and thus the approximate is often inaccurate.

Basically, safety factors are instituted to assure minimum clearances at all times thereby not optimizing the thermal expansion and sag allowed. Some of the problems of this method are due to its approximating qualities rather than accurate calculations. Other disadvantages and/or problems result from the inability to measure the temperature at all points, instead of sample points. As a result of these and other disadvantages and problems, significant safety factors are a necessity to assure minimum clearances but as a result optimization suffers.

Alternatively, the environmental factors have been measured on the spot and then used to calculate the actual conductor temperature in conjunction with the above mentioned conductor temperature reading. This approach is time consuming, labor intensive, indirect and often subject to large errors.

Numerous examples exist for monitoring sag using temperature including those disclosed in U.S. Pat. Nos. 5,235,861 and 5,517,864. In the background section of each of these patents, the early disadvantages of temperature measurement techniques are pointed out. These disadvantages include the highly conservative current ratings resulting from an assumed combination of worst cooling conditions. It is noted that these often include a combination of highest expected ambient temperature and lowest wind speed, all of which are rarely the actual conditions. These patents then describe the improvements each has made to the monitoring of sag using temperature, improvements including adding a time function to the calculation, that is to intermittently calculate rather than worst case scenario. Another prior art method involves the actual measurement of conductor sag or alternatively the ground clearance. This has been done with actual measuring, using acoustics, microwaves, and laser beams, although none of these methods has proven to be practical. The equipment is often bulky and heavy. It is also expensive. The equipment is typically installed on the ground under the conductor and thus must be left unattended whereby it is subject to vandalism, and it reduces the clearance at the critical center portion of the line where it is installed.

Another prior art method involves measuring the power line tension at a suspension point. Since the line tension is affected by its inclination angle, by knowing the tension, the inclination angle can be determined and thus the sag. It has been found that certain limitations and/or disadvantages are associated with this tension measuring method. First, load cells used to measure the tension must be capable of measuring very small changes in a large static tension which is continuous on the line; and as a result, the accuracy of the sag determination is based upon the accuracy of the load cell and its capability of measuring small tension changes. Second, often load cells must be installed in-line which requires de-energizing and cutting of the line; and as a result, significant labor expense and line downtime is incurred. Finally, many of the current tension reading load cells must be installed on the grounded end of insulators holding the line at dead-end structures; and as a result, calculations cannot be performed on all spans.

Numerous examples exist for monitoring sag using tension including those disclosed in U.S. Pat. No. 5,454,272. The device described herein analyzes mechanical waves to determine the tension in a cable. Basically, the line is contacted with an impact stimulus with a force transverse to a length of the line thereby creating an incident vibrational wave in the line. The wave is propagated along the length of the line and propagation wave is sensed by a first accelerometer which detects the passing and amplitude of the wave. A second accelerometer spaced apart from the first accelerometer subsequently senses the passing and amplitude of the same wave. Tension is then calculated using these two measurements. A complex system and equipment is needed to perform this type of testing such as the one shown in the figures of this patent.

It is thus desirable to discover a simplified, more accurate, easy to use, time sensitive, system of monitoring sag in power transmission lines.

SUMMARY OF THE INVENTION

Objectives of the invention include providing an improved device, system and method of monitoring sag in power transmission lines.

A further objective is to provide such an improved sag monitor that provides for accurate sag measurement so as to allow electric utilities assurances of minimum clearances while also providing maximum load in the lines.

A further objective is to provide such an improved sag monitor that accurately determines the inclination angle of the power line.

A further objective is to provide such an improved sag monitor that accurately determines conductor's sag and clearance.

A further objective is to provide such an improved sag monitor, that accounts for all factors affecting sag such as ambient temperature, wind speed and direction, solar radiation and any other factors that affect sag.

A further objective is to provide such an improved sag monitor that provides for the full utilization of power transmission lines.

A further objective is to provide such an improved sag monitor that measures the sag of energized electrical conductors in real time as it changes with the electrical load on the line.

A further objective is to provide such an improved sag monitor that measures the sag of energized electrical conductors at regular intervals.

A further objective is to provide such an improved sag monitor that measures the sag of energized electrical conductors and transmits such information to a receiver for monitoring and/or load adjustment.

A further objective is to provide such an improved sag monitor that senses the inclination angle of a line to determine sag and thus assure minimum clearance.

A further objective is to provide such an improved sag monitor that incorporates the use of an accelerometer or inclinometer which outputs voltage based upon its angle and thus via a simple mathematical equation is sensing the inclination angle of a suspended conductor at suspension points.

A further objective is to provide such an improved sag monitor that is not intrusive to the power line, that is a sag monitor that does not require the de-energizing, severing or other disabling of the power line for installation or use.

A further objective is to provide such an improved sag monitor that is installable and continuously or intermittently usable on an energized power line.

A further objective is to provide such an improved sag monitor that accurately defines maximum line capacity in real time.

A further objective is to provide such an improved sag monitor that transmits inclination angle, sag and/or clearance information to a remote site where power line load may be controlled.

A further objective is to provide such an improved sag monitor that may be electrically coupled in a daisy chain or other manner with other sag monitors.

A further objective is to provide such an improved sag monitor that is flexible, more accurate, easy to install, and cost effective.

A further objective is to provide such a sag monitor that incorporates one or more or all of the above objectives and advantages.

These and other objectives and advantages of the invention are obtained by the improved sag monitor, the method of manufacture and the method of use of the present invention, the general nature of which may be stated as including a sag monitor system for use on a span of a power conductor, the span being a section of the power conductor suspended between a pair of transmission towers, the sag monitor system for monitoring sag therein during power transmission. The sag monitor system comprising an accelerometer, a transmitter, a transceiver, and a remote processor. The accelerometer positionable adjacent to the power conductor approximate one of its suspension points, the accelerometer outputting a voltage correlated to an angle of inclination of the conductor. The transmitter electrically connected to the accelerometer for reading the voltage outputted by the accelerometer and transmitting signals indicative of the voltage outputted by the accelerometer. The remote processor including a receiver for receiving signals indicative of the voltage output by the accelerometer, and calculating the sag in the power conductor based upon these signals and calibration information.

BRIEF DESCRIPTION OF THE DRAWINGS

Preferred embodiment of the invention, illustrative of the best mode in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENT

Figure 4:
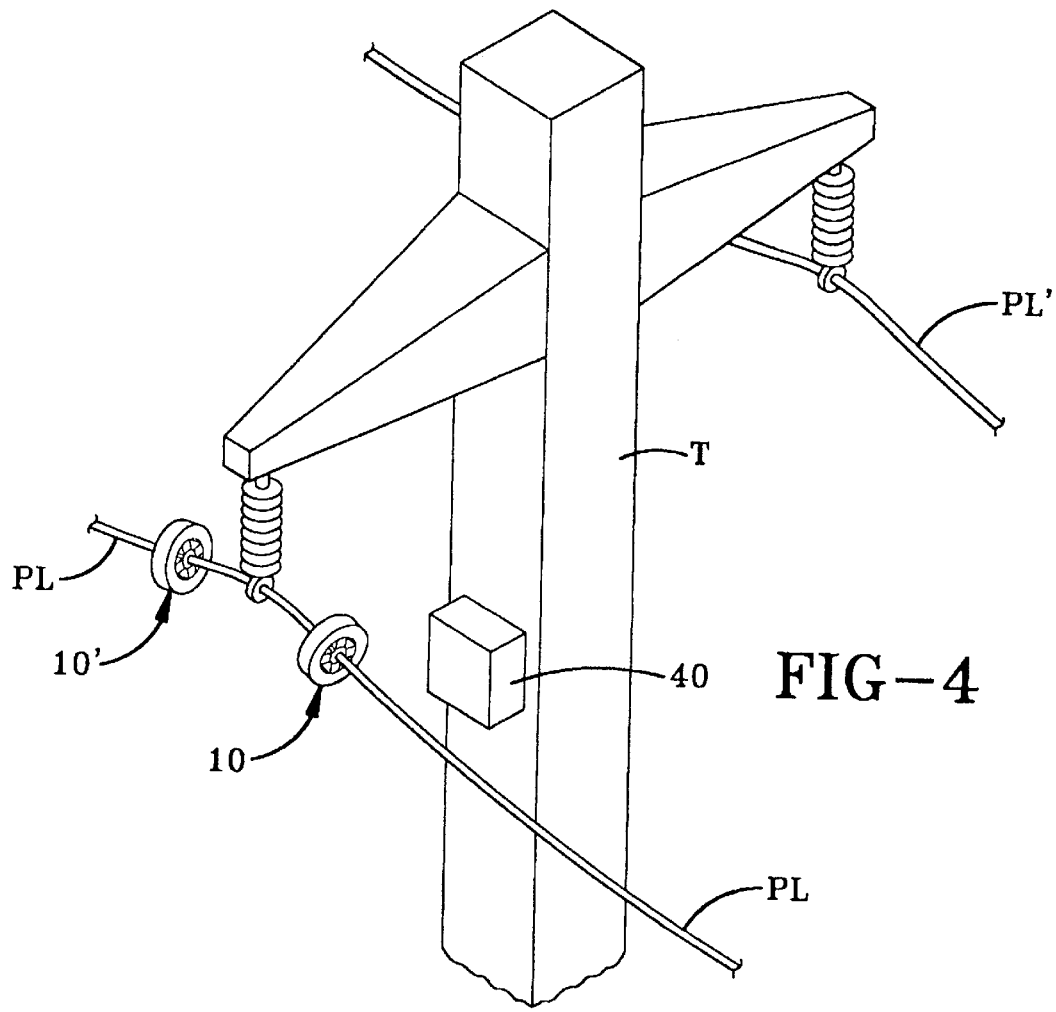
FIG. 4 is a perspective view of two power line sag monitors of the present invention positioned near the suspension point of a power line to provide for sag monitoring.
Figure 5:
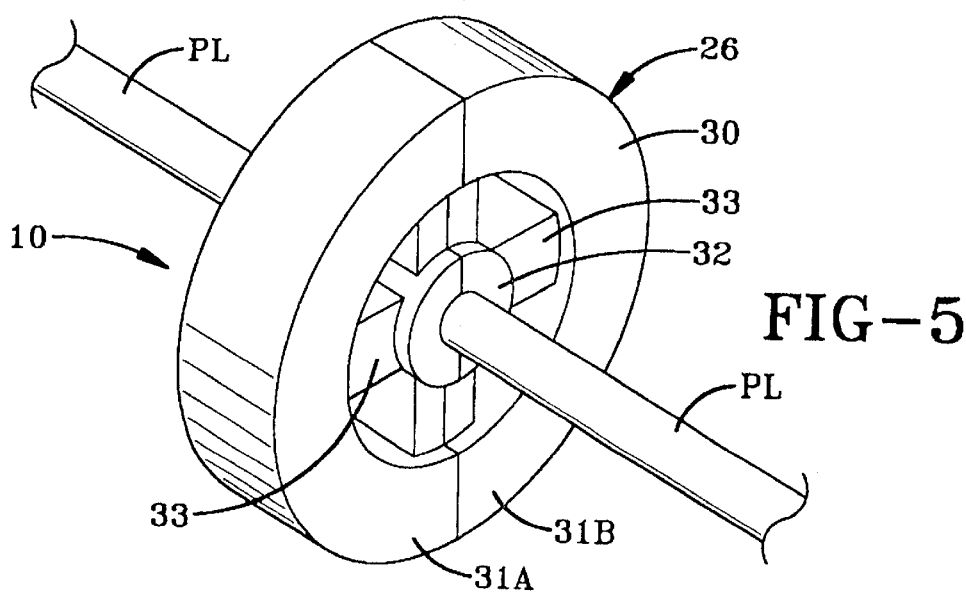
FIG. 5 is an enlarged perspective view of one of the sag monitors of FIG. 4 in electrical communication via a field transceiver to a central computer.

The invention is an improved sag monitor system 9 as schematically shown in FIG. 4 which includes one or more improved sag monitors 10. The invention is further these one or more improved sag monitors 10 as best shown in FIG. 5 and in its environment in FIG. 4 where it is positioned on a power line PL for monitoring the sag in that particular span.

Figure 1:
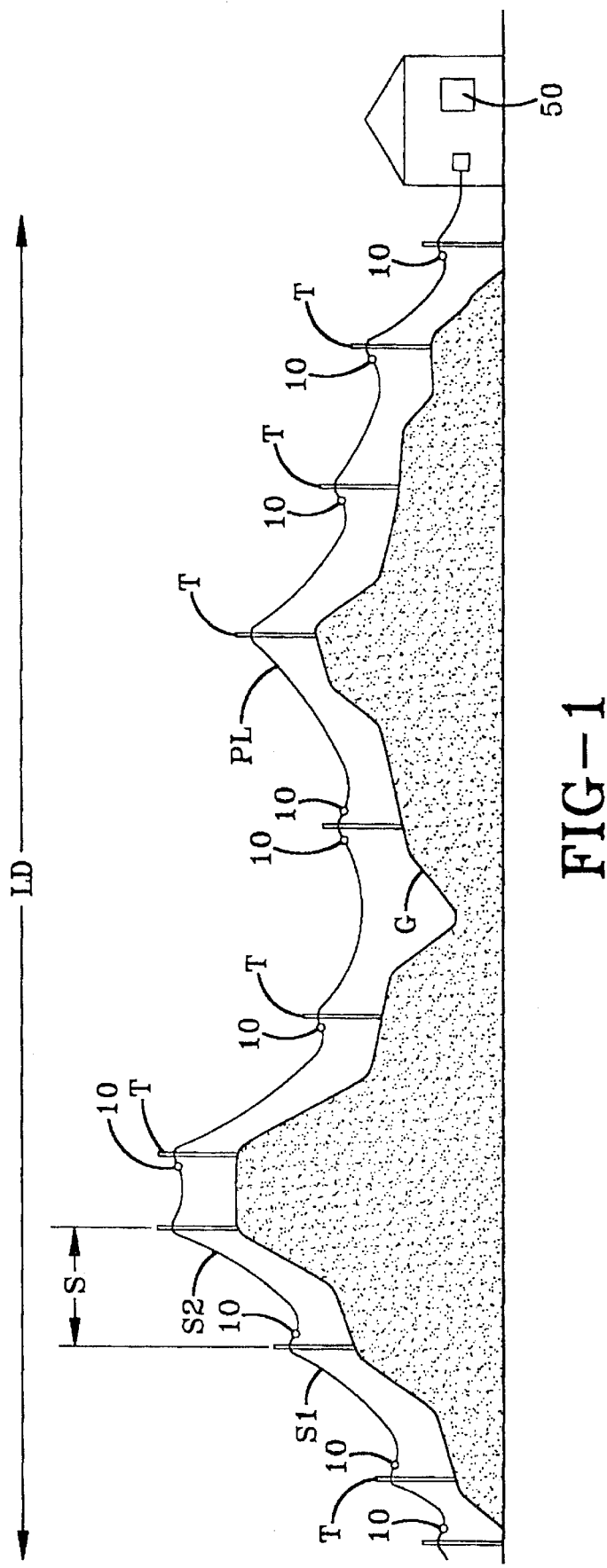
FIG. 1 is a diagrammatic view of typical power lines on uneven terrain as is often the case.

As is well known in the art, the power line PL (or more multiple power lines) as shown in part in FIG. 4 and in significantly larger part in FIG. 1 extends over long distances LD and is supported over these long distances by a plurality of towers T. Basically, the power line PL spans between these towers T which are in series across the land between cities, counties, towns, states, and countries where the towers T follow the terrain of the ground G which vary from flat to rather mountainous or otherwise treacherous. As is shown in FIG. 1, this cumulative series of towers T transports electricity from one station, sub-station or other terminal to another. The cumulation of a multiplicity of these cumulative series of towers is a vast network extending across entire cities, counties, states, regions, countries or continents.

In more detail, FIG. 1 clearly shows a big segment of a power line PL that follows the terrain of the ground as it extends up or climbs mountains and extends down into valleys and across plains or flat areas. The power line PL in effect does so by spanning S between the plurality of towers T where the power line PL sags A in between each set or pair of towers such as between towers T1 and T2 as better shown in FIG. 2. The transmission towers T1 and T2 are similar or exemplary of those erected across the countryside so as to elevate the power lines PL significantly above the ground.

Figure 2:
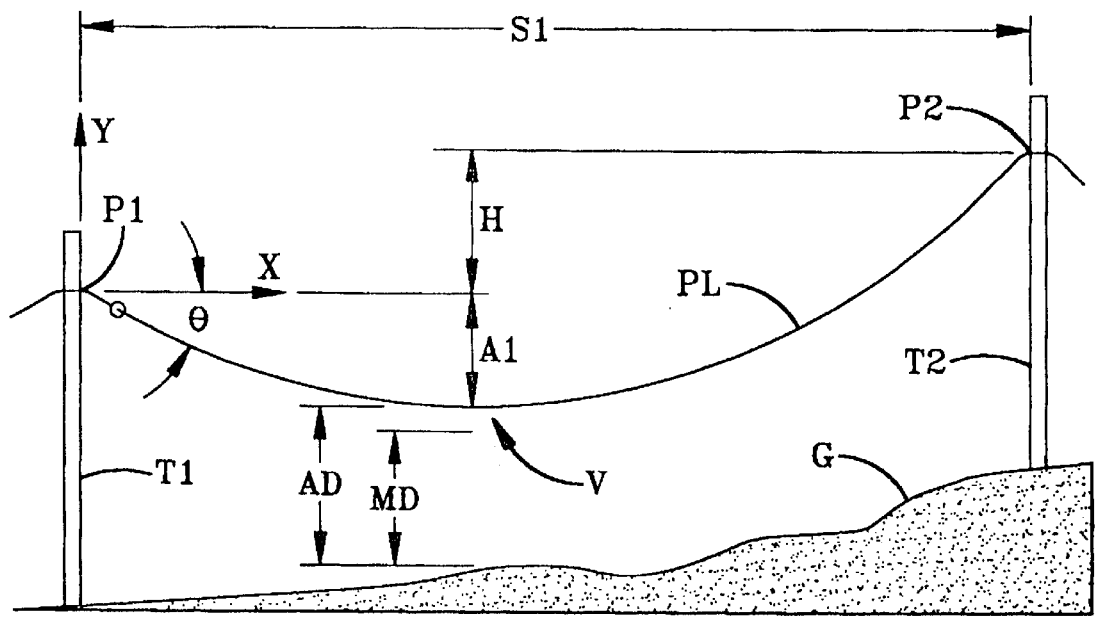
FIG. 2 is a side elevational view of one section of the power lines of FIG. 1 shown with a sag that provides for sufficient safety clearance between the line and the ground below it.

One span S1 is shown enlarged in FIG. 2 where the power line PL extends or spans from a first transmission tower T1 to a second transmission tower T2 thereby defining this span S with a sag A therebetween as the line is not taut. As the ground is often not flat, the towers T1 and T2 are generally not at the same elevation although each is generally of the same construction and thus height, and as a result, the power line PL sags from a first suspension point P1 to a valley V and back to a second suspension point P2 that is higher than the valley V and P1. The difference in height between the suspension points P1 and P2 is height difference H.

As is well known in the art and described above, it is critical that each of these power lines PL remains a certain minimum distance MD above the ground G or any structure as is shown in FIG. 2 where the actual distance AD is above the minimum distance MD. As a result, the sag A in each power line PL must be controlled under all environmental and load conditions; conditions which as discussed above result in significant variations in the sag A of a given power line PL. When the conditions are not properly controlled and the sag elevates to above allowable levels, the power line PL sags below the minimum distance MD from the ground to a violating distance VD that is too close to the ground G or a structure.

Figure 6:
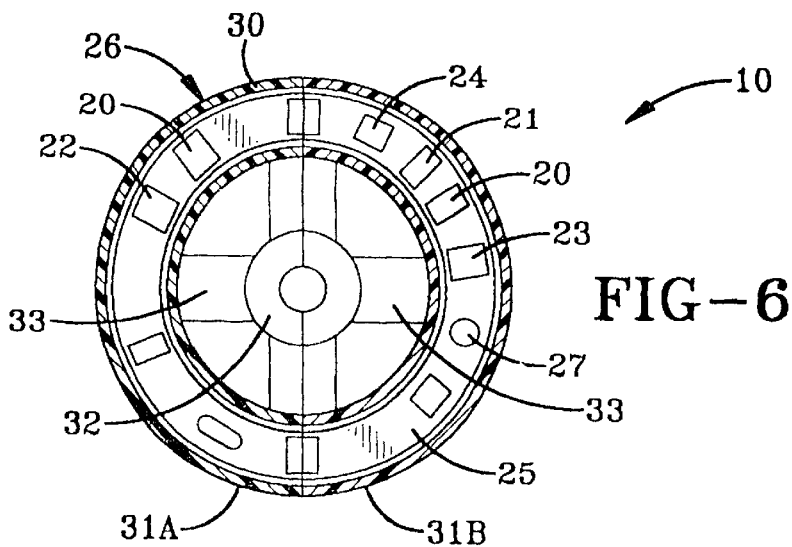
FIG. 6 is a schematic of the inside of the housing of the sag monitor showing some of the basic internal parts of one embodiment of the sag monitor of FIGS. 4-5.

The sag monitor 10 (FIGS. 4-6) of the present invention is used to monitor this sag S1 (FIGS. 2-3) so as to allow up to optimal load to be transmitted through the lines while maintaining safe conditions including a minimum distance MD from the ground. In accordance with one of the main features of the invention, the sag monitor 10 (FIG. 6)

includes one or more accelerometers or inclinometers 20, a voltage reader or meter 21 or other means of electronically or otherwise interpreting the output of the accelerometer and providing such to the converter, a converter 22 or other means of converting the signal provided from the meter to one capable of wireless transmittal, a transmitter 23 for transmitting a wireless signal indicative of the output which is correlated to the angle of inclination, a power supply 24 or means for using power from the energized power line to power the sag monitor, a board or frame or other structure 25 on which all of the components are oriented and installed, and a weather-tight housing 26 in which all of these components are housed. The sag monitor may also include an optional temperature sensor 27 for monitoring the temperature in the sag monitor as a safety precaution.

In the first embodiment, the housing 26 is a weather-tight, corona-free toroidal housing as best shown in FIG. 5. The housing 26 in the displayed embodiment includes a hollow toroidal body 30, a center hub 32 through which the power line PL extends, and a number of spokes 33 extending radially out from hub 32 to donut body 30. The entire housing 26 including the donut body 30 and hub 32 is split along a radial plane into two similar portions 31A and 31 B.

In more detail, the center hub 32 of housing 26 is mounted around power line PL where the overall housing is in a radial plane to the power line such that the rotational position of the toroidal housing has no effect on its measurement of the inclination angle as described below.

The housing 26 is a splittable body with a hollow interior in which the accelerometers or inclinometers 20, converter 22, transmitter 23, power supply 24, temperature sensor 27, and other parts are affixed and stored. This is shown in schematic in FIG. 6. One example of a housing is a weather-tight NEMA 4 aluminum box.

The accelerometer 20, converter 22, transmitter 23, power supply 24, temperature sensor 27, and any other sensors or electronic components are either affixed directly to the housing 26 in its hollow interior, or these components are attached to one or more boards 25 which are then affixed, pinned or otherwise held within the hollow interior of the housing 26. As indicated below, the position that these components are affixed such that rotation of the housing around the conductor has no bearing on the measured inclination angle.

In accordance with another of the features of the invention, the direction and angle of the accelerometer 20 on the board 25 and/or within the housing 26 is such that its output is directly resultant from its inclination angle and thus the changes in sag and ground clearance are determined based upon a change in angle of inclination and calibration factors produced at installation. Basically, the power line length L changes whereby such variation of length changes sag A and ground clearance AD, and as the power line PL length L increases the inclination angle θ or slope of the power line at its suspension points, SI for instance, increases. The accelerometer produces a unique output that varies with inclination angle of the monitor, and the accelerometer 20 can be installed within the housing 26 or on the board 25 that is in the housing 26 in a manner that its output would be unique for any angle θ of the power line PL. As a result, the positioning of the accelerometer and the board, if used, are critical whereby once the accelerometer and the housing, if used, is installed around the power line PL the accelerometer 20 must be properly positioned for such measurements.

In one embodiment, the accelerometer 20 may be a flexure suspension servo type accelerometer, a micro machined type accelerometer, a electrolytic type accelerometer, a seismic mass accelerometer, a spring-mass accelerometer, a transduction accelerometer such as piezoelectric accelerometer, a servo accelerometer, or any other type of accelerometer as is known in the field.

It is contemplated that the accelerometer 20 be any type of accelerometer, inclinometer, or other device including a sensing element for measuring displacement (change in position), deformation resulting in stress in an element, or mechanical stress to a transduction element such as a piezoelectric crystal. One example of such sensing element is the accelerometer which uses a seismic mass such as metal disk or a bar that is restrained by a spring where forces act on the mass causing mass displacement which is measured. It is understood that any type of accelerometer will function to satisfy the needs of this invention so long as the accelerometer is thermally stable as it Will be exposed to a wide range of temperatures on the line based upon environmental variables as well as load induced heat. It is feasible that the accelerometer must be stable at temperatures from a low of −50° C. to a high of 80° C., if not over a broader range, or compensation may be provided to counteract thermal effects.

The accelerometer 20 may often need to be calibrated at the time of installation to assure that it is properly oriented with respect to a gravitational vertical line so as to allow it to read correct inclination angles. Alternatively, the system can be programmed to adjust for any variations in the system from proper orientation.

The accelerometer 20 is attached around the power line and thus only inches away from the power line. As a result, the accelerometer is subject to high 60 Hz electric and magnetic fields. However, the accelerometer's output should not be affected by the magnetic field and as a result, no magnetic field shield is required. Electric field shielding is provided by the conductive housing.

In one embodiment, converter 22 is embodied as a 16 bit, 8 channel A/D converter which is electrically connected to the accelerometers 20 and reads or receives the accelerometer output transmitter 23 receives and converts this output to a radio frequency or other wireless transmittable signal, and transmits it. It is recognized that other technology may be used to accomplish these tasks without deviating from the scope of this invention.

Power supply 24 is needed to supply the needed power to the sag monitor 10 for numerous operations. Since all of the operations including reading the accelerometers, converting the readings into wireless transmittable signals, and transmitting it occur or need only to occur during power transmission, then the actual power in the power lines may be used as a power supply 24 to the sag monitor. 10. As is well known in the art, a magnetic field is created by the current flowing in high voltage power lines and it is the energy of this magnetic field that is used as a power supply for the operations of the sag monitor 10.

An optional temperature sensor 27 may be provided for monitoring temperature in the housing 26 and indirectly surrounding the housing.

Only one accelerometer 20 is needed to monitor sag although it is contemplated that multiple accelerometers could be used to assure more accurate and reliable monitoring.

In accordance with one of the features of the invention, a transceiver 40 (FIG. 4) is provided in reasonable proximity to a plurality of sag monitors 20 where one such sag monitor 20 is positioned on one portion of power line PL while other sag monitors are positioned on other portions of the power line PL.

One example is shown in FIG. 4 where two sag monitors 10 and 10' on two separate portions of power line PL monitor sag on their respective portions and transmit such data to the closely proximate transceiver 40. It is critical in this case that each sag monitor transmit data as to both sag and what portion of the power line the monitor is located on.

Figure 7A:
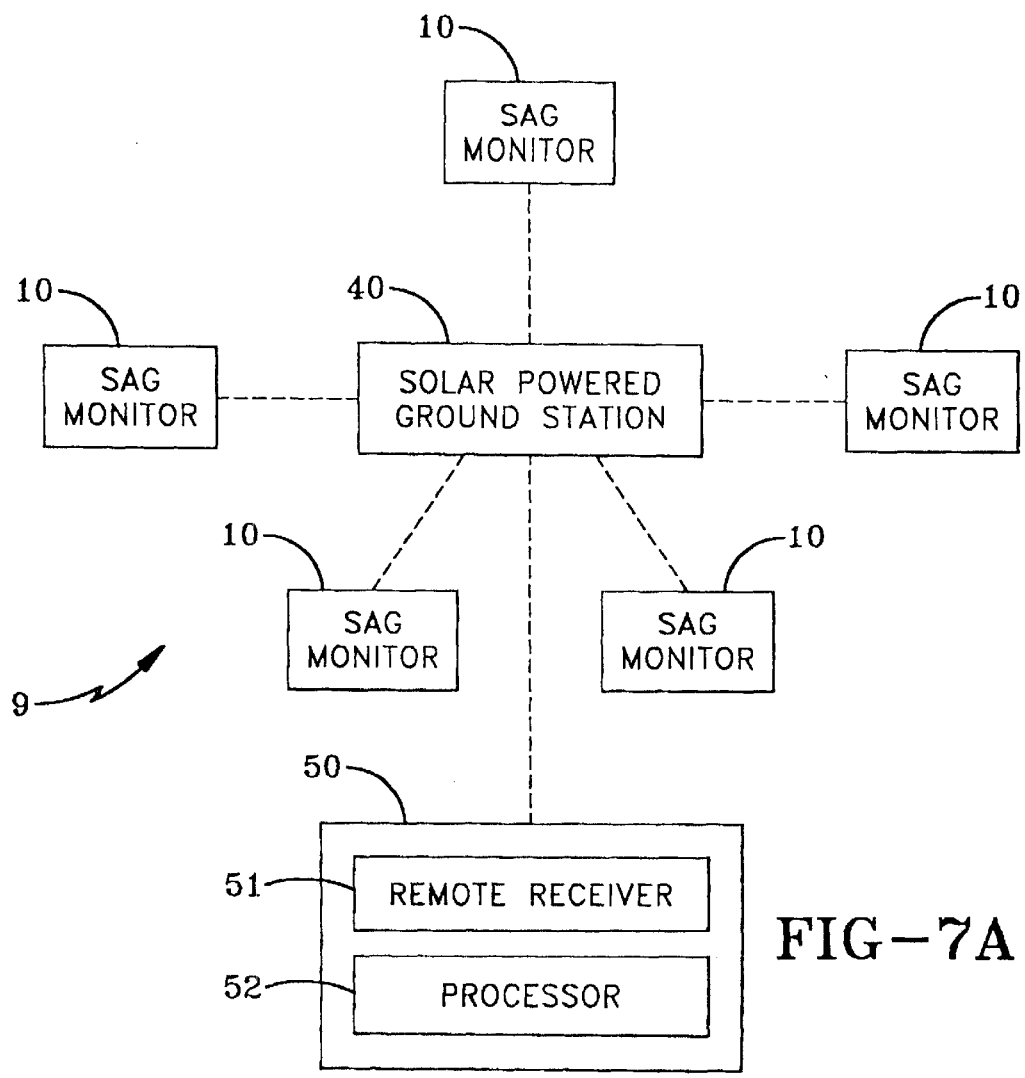
FIG. 7A is a schematic of the overall system which includes one or more sag monitors, each in close proximity to, and communicating with, a single ground station (star configuration). The ground station communicates with and relays the measured inclination angles to a remote receiver and processor.
Figure 7B:
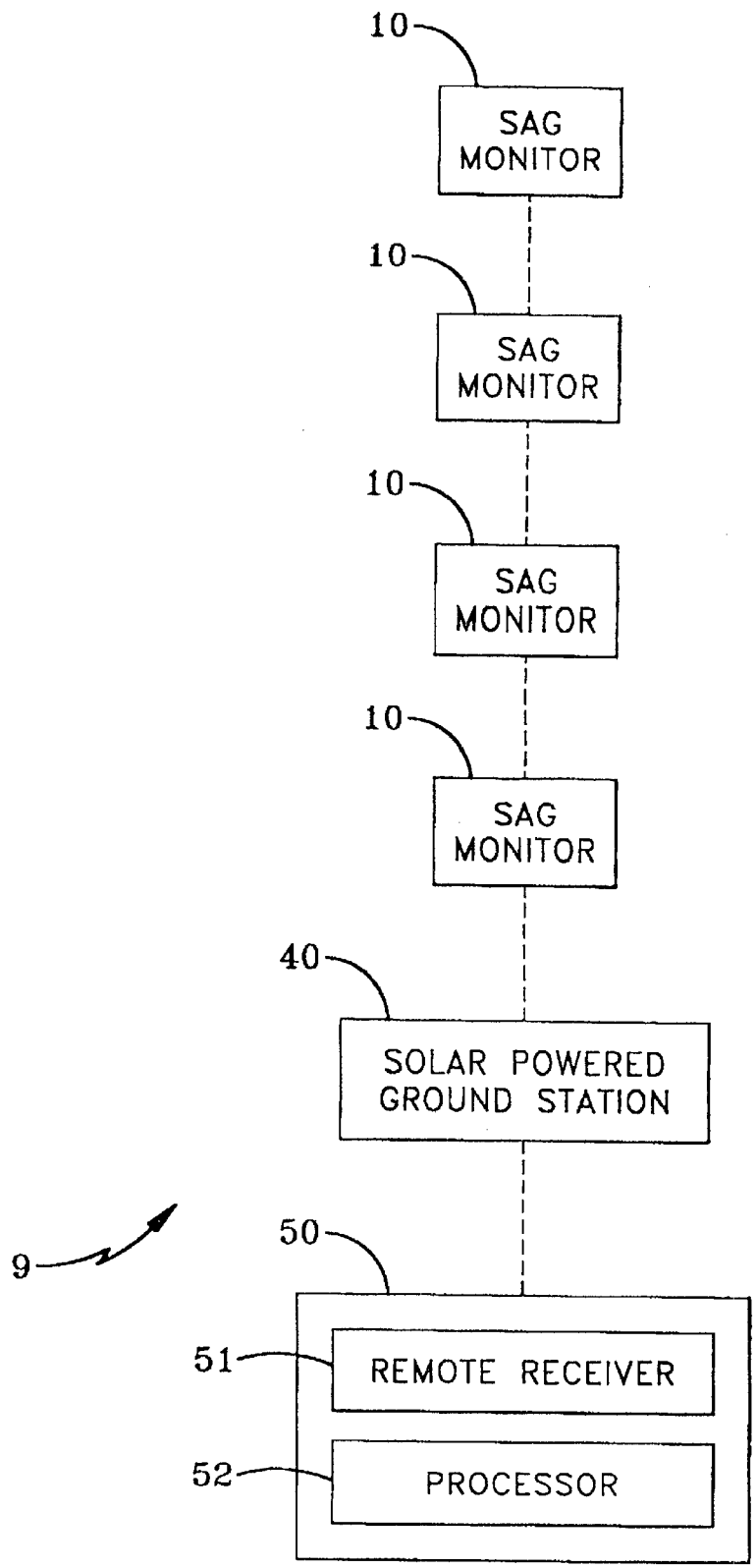
FIG. 7B is a schematic of the overall system for monitoring a long stretch of a power line where each sag monitor communicates with its immediate neighbor sag monitors, passing messages in either direction (daisy-chain). Measurements from a distant sag monitor are thus relayed to the single ground station for transmission to the remote receiver and processor.

The transceiver 40 is basically a receiver for receiving the signals transmitted by the sag monitors 10, and a transmitter for transmitting these signals to a central computer 50 at a remote site such as at a facility of the electric company where power transmission amounts are controllable. This central computer 50 is a remote receiver 51 with a processor 52 as schematically shown in FIG. 7A.

The transceiver 40 is preferably solar powered and in one embodiment incorporates wireless telephone capabilities such as that of an analog or digital phone to transmit its information via satellite and communication towers. In this same embodiment, the transmitters 23 are more basic wireless devices with limited range.

In accordance with another feature of the invention, the central computer 50 then receives the data at a remote receiver 51 and processes this data via processor 52. The data received is in one embodiment a voltage reading and a location reading. The location reading indicates to the processor which accelerometer is supplying that particular voltage reading. The voltage reading is processed using calibration information via one or more equations to determine the sag and clearance of the reporting span.

The electric utility is now aware of the actual sag in the line at a given time under the conditions at that time. Since the sag monitors 10 transmitted this information via the transceiver 40 to the remote central computer 50, the current sag at that point is known. The computer then examines all of the sag calculations across the entire power line PL and the power transmitted via the power line PL can be adjusted up or down as needed based upon demand and minimum clearances. These steps of reading the voltage, transmitting the data, analyzing the data to determine sag, etc. can be repeated as often as is necessary or at regular intervals.

Figure 3:
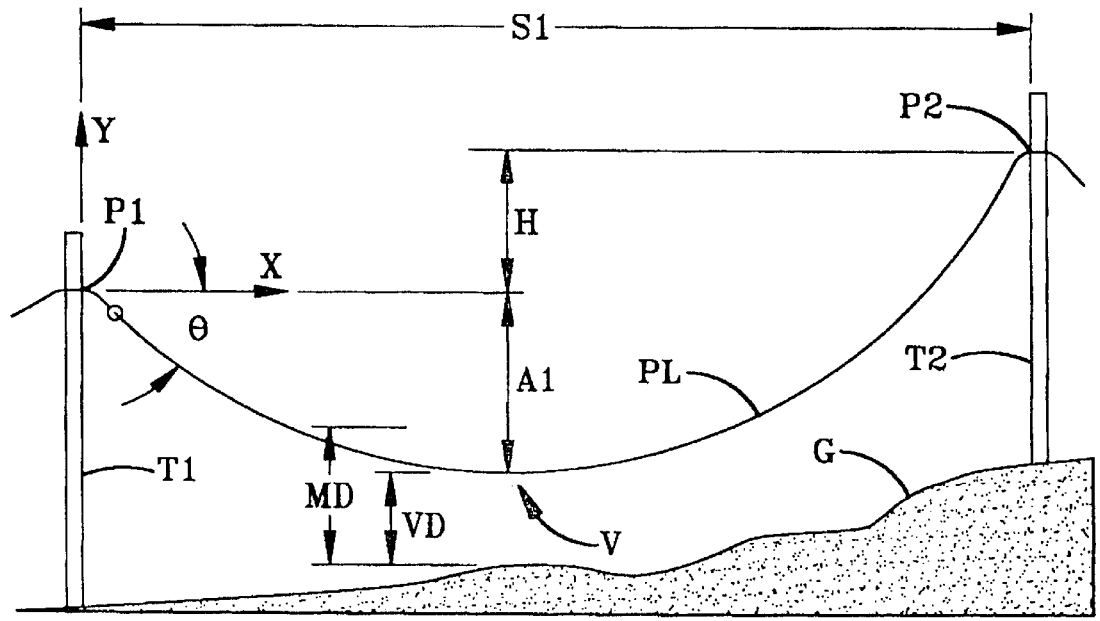
FIG. 3 is the same side elevational view as in FIG. 2 except the thermal expansion from electrical load or other sag-causing factors have caused the one section of power line to sag outside of the safety clearance range and thus become too close to the ground.

For the general case of unequal suspension heights and unflat terrain, the equation for the height difference from the lower suspension point tot he line at any horizontal location, X, is:

$$Y=S^*\tan(\theta)^*\{[-(A/B)^*f]+Sh(X/S)\}+[H^*f]$$

where
A=2.163953=Sh(1)/(Ch(1)−1)
B=1.841347=1/(Ch(1)−1)
f=B*[Ch(X/S)−1]
Sh=hyperbolic sine
Ch=hyperbolic cosine
S=Line Span (S1 in FIGS. 2 & 3)

For the special case of flat terrain and suspension points at equal heights, the sag equation reduces to:

$$G=A-\text{SqRt}(A^2-1)=0.24492$$

$$\text{Sag}=A1 \text{ of FIGS. 2 and 3}=G^*S^*\tan(\theta)$$

where
SqRt=square root of

In accordance with this feature of the invention as to calculation of the actual sag from the voltage output, the sag may be accurately approximated using the catenary equation, the accelerometer output, and the correlation of the accelerometer output to the inclination angle. All of this is a result of the realization that the shape of an overhead conductor or power line PL that spans S between two points is approximated by the catenary equation. As indicated above, it is also well known that the electric current or load in the power line as well as the ambient temperature, wind and sunshine effect the length of the suspended line by varying its temperature and thus its sag. Basically, load, outside warmth, etc. heat up the power line PL causing thermal expansion whereby the power line extends in length L and as a result the inclination angle θ becomes more negative.

It has been discovered that there is a unique relationship between the voltage output of an accelerometer based upon its position and the conductor sag via the inclination angle θ. Basically, the output of the accelerometer is a DC voltage related to the sine of its tilt angle relative to horizontal. This output is then transformed into the angle of inclination which is then transformed into the conductor sag.

As a result, the electric utility may monitor sag Al in any given span S of any section of power line PL, or in critical sections, or in every section to assure minimum clearances are maintained. The utility may also maximize the electricity transported via the lines. All of this can be done on a demand basis (when it is desired), in regular intervals, or continuously. Based upon the transmitters and transceivers, the sag is known in real time. The sag monitors may be daisy chained together to transceivers to save transmitter costs. The transceivers may be solar powered while the sag monitors operate off of the magnetic filed provided by the power line.

The sag monitors' use of accelerometers assure the electric utility that all factors affecting sag are accounted for because the output is directly related to angle of inclination which is directly related to sag and as a result actual sag is accurately approximated.

It has been discovered that the sag monitors 10 are preferably positioned at the lower suspension point P1 of each span S.

Accordingly, the improved sag monitor achieves all the enumerated objectives, provides for eliminating difficulties encountered with prior devices and methods, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved sag monitor is constructed and used, the characteristics of the construction, and the advantageous, new and useful results obtained; the new and useful structures, devices, elements, arrangements, parts and combinations, are set forth in the appended claims.

What is claimed is:

1. A sag monitor system for use on a span of a power conductor, the span being a section of the power conductor suspended between a pair of transmission towers, the sag monitor system for monitoring sag therein during power transmission, the sag monitor system comprising:

an accelerometer positionable adjacent and parallel to the power conductor approximate one of its suspension points, the accelerometer outputting a voltage correlated to an angle of inclination of the conductor;

a transmitter electrically connected to the accelerometer for reading the voltage output by the accelerometer and transmitting signals indicative of the voltage output by the accelerometer;

a remote processor including a receiver for receiving signals indicative of the voltage output of the accelerometer, and calculating the sag in the power conductor based upon these signals, wherein multiple accelerometers are each positionable adjacent to the power conductor on different spans thereof whereby each accelerometer has an associated transmitter electrically connected thereto for reading the voltage output by that accelerometer and transmitting signals indicative of the voltage output by that accelerometer, and where the remote processor receives signals indicative of the voltage output by all of the multiple accelerometers whereby such signals each is identifiable to its respective accelerometer, and further comprising a transceiver for use with one or more accelerometers, the transceiver for receiving voltage output signals from the transmitters connected to each of the accelerometers and transmitting a long distance signal indicative of the voltage outputs to the remote processor, and the multiple accelerometers are aligned in series whereby voltage output signals from each accelerometer is communicated via other accelerometers until such output signals are received by the transceiver and transmitted as the long distance signal indicative of the voltage outputs to the remote processor.

2. The sag monitor system of claim 1 wherein each accelerometer is housed in a housing fitted over the power conductor where the housing further includes the respective transmitter.

3. The sag monitor system of claim 2 wherein each housing is a corona free housing.

4. The sag monitor system of claim 1 wherein each accelerometer is an inclinometer, and the transceiver is remote from the accelerometers and is solar powered.

5. The sag monitor system of claim 1 wherein the accelerometer and transmitter are powered by a magnetic field provided by the power conductor.

6. The sag monitor system of claim 1 wherein the remote processor calculates the sag from the output signals received.

7. The sag monitor system of claim 6 wherein the angle of inclination is used to calculate the sag based upon the equation that the sag equals 0.24492 multiplied by the span which is multiplied by the tangent of the inclination angle when the towers are at approximately the same elevation and the land between the towers is relatively flat.

8. The sag monitor system of claim 1 wherein the output is used to calculate the angle of inclination based upon a calibration equation correlating that for a particular accelerometer the output varies with the angle of inclination.

9. The sag monitor of claim 1 wherein each accelerometer measures the angle that the power conductor is from horizontal by approximating an inclination angle at the respective suspension point.

10. The sag monitor of claim 1 further comprising a microprocessor which approximates/calculates the sag in the power line based upon the inclination angle.

11. A sag monitor for use on a first span of a power conductor suspended between a pair of transmission towers, the sag monitor for monitoring the sag therein during power transmission, the sag monitor comprising:

a housing positionable adjacent to a power conductor approximate one of its suspension points; and a plurality of accelerometers affixed within the housing, each individual accelerometer providing a voltage output indicative of an angle the power conductor is from the horizontal, wherein all of the accelerometers within the housing are approximately within the same normal plane of the power conductor, wherein the sag is calculated as about 0.25 multiplied by the span multiplied by the tangent of the inclination angle when the towers are at approximately the same elevation and the land therebetween is relatively flat.

12. The sag monitor of claim 11 wherein each accelerometer measures the angle that the power conductor is from horizontal by approximating an inclination angle at the respective suspension point.

13. The sag monitor of claim 11 further comprising a microprocessor which approximates/calculates the sag in the power line based upon the inclination angle.

14. The sag monitor of claim 11 wherein a second sag monitor is used on a second span of the power conductor between two other pair of transmission towers, and the sag monitor and the second sag monitor each include a transmitter for sending signals indicative of the output of the respective accelerometer to a remote receiver.

15. The sag monitor of claim 14 further comprising a transceiver positioned approximate yet separate from the sag monitor and second sag monitor for receiving the signals from the accelerometers indicative of the output thereof and transmitting such signals to the remote receiver.

16. The sag monitor of claim 15 further comprising a microprocessor which approximates/calculates the sag in the power line based upon the inclination angle.

17. The sag monitor of claim 16, wherein the microprocessor uses the voltage output to calculate the angle of inclination based upon a calibration equation correlating that for a particular accelerometer the output voltage varies with the angle of inclination.

18. The sag monitor of claim 15 wherein each accelerometer is an inclinometer, and the transceiver is remote from the accelerometers and is solar powered.

19. The sag monitor of claim 15, wherein the accelerometers of the sag monitor and the second sag monitor are aligned in series whereby voltage output signals from each accelerometer is communicated via other accelerometers until such output signals are received by the transceiver and transmitted as a long distance signal indicative of the voltage outputs to the remote processor.

20. The sag monitor of claim 15 wherein the accelerometer and transmitter are powered by a magnetic field provided by the power conductor.

21. The sag monitor of claim 11 wherein the housing is a corona free housing.

22. A sag monitor system for use on a span of a power conductor, the span being a section of the power conductor suspended between a pair of transmission towers, the sag monitor system for monitoring sag therein during power transmission, the sag monitor system comprising:

a first accelerometer being positionable adjacent and parallel to the power conductor approximate one of its suspension points, the first accelerometer outputting a voltage correlated to an angle of inclination of the power conductor;

a transmitter electrically connected to the first accelerometer for reading the voltage output by the first accelerometer and transmitting signals indicative of the voltage output by the first accelerometer;

a remote processor including a receiver for receiving signals indicative of the voltage output of the first accelerometer, and calculating the sag in the power conductor based upon these signals; wherein multiple first accelerometers are each positionable adjacent to the power conductor on different spans thereof whereby each first accelerometer has an associated transmitter electrically connected thereto for reading the voltage output by the first accelerometer and transmitting signals indicative of the voltage output by the first accelerometer; and where the remote processor receives signals indicative of the voltage output by all of the multiple first accelerometers whereby such signals each is identifiable to the respective first accelerometer, and further comprising a transceiver for use with one or more first accelerometers, the transceiver for receiving voltage output signals from the transmitters connected to each of the first accelerometers and transmitting a long distance signal indicative of the voltage outputs to the remote processor, and the remote processor calculates the sag from the output signals received, and the angle of inclination is used to calculate the sag based upon the equation that the sag equals about 0.24492 multiplied by the span which is multiplied by the tangent of the inclination angle when the towers are at approximately the same elevation and the land between the towers is relatively flat.

23. The sag monitor system of claim 22 wherein the system further comprises:

a housing adapted to be mounted onto a span of the power conductor, wherein the first accelerometer is affixed within the housing;

a second accelerometer affixed within the housing, the first and second accelerometers lying approximately within the same radial plane of the power conductor.

24. The sag monitor of claim 23 further comprising a microprocessor which approximates/calculates the sag in the power line based upon the inclination angle.

25. The sag monitor system of claim 23 wherein the housing is fitted over the power conductor and the housing further includes the respective transmitter.

26. The sag monitor system of claim 23 wherein the housing is a corona free housing.

27. The sag monitor system of claim 22 wherein one:or more first accelerometers are located relatively close to the transceiver and the transceiver is adapted to receive voltage output signals from one or more of the relatively close first accelerometers and to transmit a long distance signal indicative of the voltage outputs of the one or more relatively close first accelerometers to the remote processor.

28. The sag monitor of claim 22 wherein each first accelerometer is an inclinometer and the transceiver is remote from the first accelerometer and is solar powered.

29. The sag monitor system of claim 22, wherein the multiple first accelerometers are aligned in series whereby voltage output signals from each first accelerometer are communicated via other first accelerometers until such output signals are received by the transceiver and transmitted as a long distance signal indicative of the voltage outputs to the remote processor.

30. The sag monitor system of claim 22 wherein the first accelerometer and transmitter are powered by a magnetic field provided by the power conductor.

* * * * *